(12) United States Patent
Jiang et al.

(10) Patent No.: US 8,237,668 B2
(45) Date of Patent: *Aug. 7, 2012

(54) TOUCH CONTROL DEVICE

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 447 days.

This patent is subject to a terminal disclaimer.

(21) Appl. No.: 12/286,140

(22) Filed: Sep. 29, 2008

(65) Prior Publication Data

US 2009/0167707 A1 Jul. 2, 2009

(30) Foreign Application Priority Data

Dec. 27, 2007 (CN) .......................... 2007 1 0305833

(51) Int. Cl.
*G06F 3/041* (2006.01)
(52) U.S. Cl. ......... 345/173; 313/582; 313/336; 428/339
(58) Field of Classification Search .......... 345/173–174; 425/458; 349/12; 257/222
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 6,373,472 B1 * | 4/2002 | Palalau et al. | 345/173 |
| 6,423,583 B1 | 7/2002 | Avouris et al. | |
| 6,628,269 B2 | 9/2003 | Shimizu | |
| 6,629,833 B1 * | 10/2003 | Ohya et al. | 425/458 |

(Continued)

FOREIGN PATENT DOCUMENTS

CN 2539375 3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510,Aug. 31, 2003,32(8)(lines from the 4th line to 35th line in the right column of p. 507 may be relevant).

(Continued)

*Primary Examiner* — Peter Macchiarolo
*Assistant Examiner* — Mary Ellen Bowman
(74) *Attorney, Agent, or Firm* — Altis Law Group, Inc.

(57) ABSTRACT

A touch control device includes a transparent substrate, a display element, and a touch panel. The display element is disposed on a surface of the transparent substrate and includes a displaying surface. The displaying surface is located away from the transparent substrate. The touch panel is located on opposite side of the display element from the transparent substrate. The touch panel includes a first electrode plate and a second electrode plate. The first electrode plate includes a first substrate and a first conductive layer disposed on a lower surface of the first substrate. The second electrode plate is separated from the first electrode plate and includes a second flexible substrate and a second conductive layer disposed on an upper surface of the second substrate. The first conductive layer and the second conductive layer both include a carbon nanotube layer.

13 Claims, 4 Drawing Sheets

U.S. PATENT DOCUMENTS

| | | |
|---|---|---|
| 6,914,640 B2 | 7/2005 | Yu |
| 6,947,203 B2 | 9/2005 | Kanbe |
| 7,054,064 B2 | 5/2006 | Jiang et al. |
| 7,060,241 B2 | 6/2006 | Glatkowski |
| 7,084,933 B2 | 8/2006 | Oh et al. |
| 7,196,463 B2 | 3/2007 | Okai et al. |
| 7,215,329 B2 | 5/2007 | Yoshikawa et al. |
| 7,242,136 B2 | 7/2007 | Kim et al. |
| 7,336,261 B2 | 2/2008 | Yu |
| 7,348,966 B2 | 3/2008 | Hong et al. |
| 7,532,182 B2 | 5/2009 | Tseng et al. |
| 7,593,004 B2 | 9/2009 | Spath et al. |
| 7,630,040 B2 | 12/2009 | Liu et al. |
| 7,662,732 B2 | 2/2010 | Choi et al. |
| 7,663,607 B2 | 2/2010 | Hotelling et al. |
| 7,704,480 B2 | 4/2010 | Jiang et al. |
| 7,710,649 B2 | 5/2010 | Feng et al. |
| 7,796,123 B1 | 9/2010 | Irvin, Jr. et al. |
| 7,825,911 B2 | 11/2010 | Sano et al. |
| 7,854,992 B2 | 12/2010 | Fu et al. |
| 7,947,977 B2 | 5/2011 | Jiang et al. |
| 2002/0089492 A1 | 7/2002 | Ahn et al. |
| 2003/0122800 A1* | 7/2003 | Yu .................. 345/173 |
| 2003/0147041 A1 | 8/2003 | Oh et al. |
| 2003/0189235 A1 | 10/2003 | Watanabe et al. |
| 2004/0047038 A1 | 3/2004 | Jiang et al. |
| 2004/0053780 A1 | 3/2004 | Jiang et al. |
| 2004/0099438 A1 | 5/2004 | Arthur et al. |
| 2004/0105040 A1* | 6/2004 | Oh et al. .................. 349/12 |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kavase et al. |
| 2005/0209392 A1 | 9/2005 | Luo et al. |
| 2006/0010996 A1 | 1/2006 | Jordan et al. |
| 2006/0022221 A1* | 2/2006 | Furukawa et al. .......... 257/222 |
| 2006/0044284 A1 | 3/2006 | Tanabe |
| 2006/0077147 A1 | 4/2006 | Palmateer et al. |
| 2006/0097991 A1 | 5/2006 | Hotelling et al. |
| 2006/0171032 A1 | 8/2006 | Nishioka |
| 2006/0187213 A1 | 8/2006 | Su |
| 2006/0187369 A1 | 8/2006 | Chang |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1* | 12/2006 | Spath et al. ................. 345/173 |
| 2006/0274049 A1 | 12/2006 | Spath et al. |
| 2006/0275956 A1* | 12/2006 | Konesky .................. 438/128 |
| 2006/0278444 A1 | 12/2006 | Binstead |
| 2007/0065651 A1 | 3/2007 | Glatkowski et al. |
| 2007/0075619 A1 | 4/2007 | Jiang et al. |
| 2007/0081681 A1 | 4/2007 | Yu et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1 | 11/2007 | Philipp |
| 2007/0262687 A1 | 11/2007 | Li |
| 2007/0279556 A1 | 12/2007 | Wang et al. |
| 2007/0296897 A1 | 12/2007 | Liu et al. |
| 2007/0298253 A1 | 12/2007 | Hata et al. |
| 2008/0029292 A1 | 2/2008 | Takayama et al. |
| 2008/0088219 A1 | 4/2008 | Yoon et al. |
| 2008/0129666 A1 | 6/2008 | Shimotono et al. |
| 2008/0138589 A1 | 6/2008 | Wakabayashi et al. |
| 2008/0192014 A1* | 8/2008 | Kent et al. ................. 345/173 |
| 2008/0238882 A1 | 10/2008 | Sivarajan et al. |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0208708 A1 | 8/2009 | Wei et al. |
| 2009/0283211 A1 | 11/2009 | Matsuhira |
| 2009/0293631 A1 | 12/2009 | Radivojevic |
| 2010/0001972 A1 | 1/2010 | Jiang et al. |
| 2010/0001976 A1* | 1/2010 | Jiang et al. .................. 345/174 |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jia et al. |
| 2010/0093247 A1 | 4/2010 | Jiang et al. |
| 2010/0171099 A1 | 7/2010 | Tombler, Jr. et al. |
| 2010/0271330 A1 | 10/2010 | Philipp |
| 2011/0032196 A1 | 2/2011 | Feng et al. |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101101417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |

| | | |
|---|---|---|
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | 200722559 | 6/2007 |
| TW | 200727163 | 7/2007 |
| TW | 284927 | 8/2007 |
| TW | 200729241 | 8/2007 |
| TW | 200737414 | 10/2007 |
| TW | 200738558 | 10/2007 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

George Gruner, "Carbon Nanonets Spark New Electronics", Scientific American, pp. 76-83, May 2007.

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

Mei Zhang etal., "Strong Transparent, Multifunctional, Carbon Nanotube Sheets", Science, America, AAAS, vol. 309, pp. 1215-1219, Aug. 19, 2005.

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

Wu et al."Transparent, Conductive Carbon Nanotube Films". Science,vol. 305,(2004);pp. 1273-1276.

ASM Handbook."vol. 2 Properties and Selection: Nonferrous Alloys and Special-Purpose Materials".Apr. 2007; pp. 840-853.

Fan et al. "Self-Oriented Regular Arrays of Carbon Nanotubes and Their Field Emission Properties". Science, vol. 283, (1999);pp. 512-514.

Susuki et al."Investigation of physical and electric properties of silver pastes as binder for thermoelectric materials". Review of Scientific Instruments,76,(2005);pp. 023907-1 to 023907-5.

Yu Xiang, Technique of Touch Panel & the Production of Resistance-type Touch Panel Insulation Dot, Journal of Longyan Teachers College, p. 25-26, vol. 22, No. 6, 2004.

* cited by examiner

TOUCH CONTROL DEVICE

RELATED APPLICATIONS

This application is related to commonly-assigned applications entitled, "TOUCH PANEL", filed Sep. 29, 2008, 12/286,266; "TOUCH PANEL", filed Sep. 29, 2008, 12/286,141; "TOUCH PANEL AND DISPLAY DEVICE USING THE SAME", filed Sep. 29, 2008, 12/286,154; "TOUCH PANEL AND DISPLAY DEVICE USING THE SAME", filed Sep. 29, 2008, 12/286,189; "TOUCH PANEL AND DISPLAY DEVICE USING THE SAME", filed Sep. 29, 2008, 12/286,176; "ELECTRONIC ELEMENT HAVING CARBON NANOTUBES", filed Sep. 29, 2008, 12/286,143; "TOUCH PANEL AND DISPLAY DEVICE USING THE SAME", filed Sep. 29, 2008, 12/286,166; "TOUCH PANEL AND DISPLAY DEVICE USING THE SAME", filed Sep. 29, 2008, 12/286,178; "TOUCH PANEL AND DISPLAY DEVICE USING THE SAME", filed Sep. 29, 2008, 12/286,148; "TOUCH PANEL AND DISPLAY DEVICE USING THE SAME", filed Sep. 29, 2008, 12/286,181; "TOUCH PANEL AND DISPLAY DEVICE USING THE SAME", filed Sep. 29, 2008, 12/286,146; "TOUCH PANEL AND DISPLAY DEVICE USING THE SAME", filed Sep. 29, 2008, 12/286,216; "TOUCH PANEL AND DISPLAY DEVICE USING THE SAME", filed Sep. 29, 2008, 12/286,152; "TOUCH PANEL AND DISPLAY DEVICE USING THE SAME", filed Sep. 29, 2008, 12/286,145; "TOUCH PANEL, METHOD FOR MAKING THE SAME, AND DISPLAY DEVICE ADOPTING THE SAME", filed Sep. 29, 2008, 12/286,155; "TOUCH PANEL AND DISPLAY DEVICE USING THE SAME", filed Sep. 29, 2008, 12/286,179; "TOUCH PANEL, METHOD FOR MAKING THE SAME, AND DISPLAY DEVICE ADOPTING THE SAME", filed Sep. 29, 2008, 12/286,228; "TOUCH PANEL AND DISPLAY DEVICE USING THE SAME", filed Sep. 29, 2008, 12/286,153; "TOUCH PANEL AND DISPLAY DEVICE USING THE SAME", Sep. 29, 2008, 12/286,184; "METHOD FOR MAKING TOUCH PANEL", filed Sep. 29, 2008, 12/286,175; "METHOD FOR MAKING TOUCH PANEL", filed Sep. 29, 2008, 12/286,195; "TOUCH PANEL AND DISPLAY DEVICE USING THE SAME", filed Sep. 29, 2008, 12/286,160; "TOUCH PANEL AND DISPLAY DEVICE USING THE SAME", Sep. 29, 2008, 12/286,220; filed "TOUCH PANEL AND DISPLAY DEVICE USING THE SAME", filed Sep. 29, 2008, 12/286,227; "TOUCH PANEL AND DISPLAY DEVICE USING THE SAME", filed Sep. 29, 2008, 12/286,144; "TOUCH PANEL AND DISPLAY DEVICE USING THE SAME", filed Sep. 29, 2008, 12/286,218; "TOUCH PANEL AND DISPLAY DEVICE USING THE SAME", filed Sep. 29, 2008, 12/286,142; "TOUCH PANEL AND DISPLAY DEVICE USING THE SAME", filed Sep. 29, 2008, 12/286,241; "TOUCH PANEL, METHOD FOR MAKING THE SAME, AND DISPLAY DEVICE ADOPTING THE SAME", filed Sep. 29, 2008, 12/286,151; and "TOUCH PANEL, METHOD FOR MAKING THE SAME, AND DISPLAY DEVICE ADOPTING THE SAME", filed Sep. 29, 2008, 12/286,219. The disclosures of the above-identified applications are incorporated herein by reference.

BACKGROUND

1. Field of the Invention

The present invention relates to touch control devices and, particularly, to a carbon nanotube based touch control device.

2. Discussion of Related Art

Following the advancement in recent years of electronic technology, more and more electronic apparatuses (e.g., Global Position Systems, video and audio devices, mobile phones, and air conditions) are added in vehicles, especially in cars. However, control devices of the apparatuses are commonly disposed on a front panel of the car together with drive-control devices in a limited area and not convenient for using. Therefore, to solve the above-mentioned problem, a touch control device that includes a touch panel and a display device set on an inner surface of a windshield of the car has been developed.

Different types of touch panels that will be used in the touch control device, including resistance, capacitance, infra-red, and surface sound-wave types, have been developed. Due to their high accuracy and low-cost of production thereof, the resistance-type touch panels have been widely used.

A conventional resistance-type touch panel includes an upper substrate, a lower substrate, and a plurality of dot spacers. The upper substrate includes an optically transparent upper conductive layer formed on a lower surface thereof, and two upper electrodes connected to the optically transparent upper conductive layer at two edges along the X direction respectively. The lower substrate includes an optically transparent lower conductive layer formed on an upper surface thereof, and two lower electrodes connected to the optically transparent upper conductive layer at two edges along the Y direction respectively. The plurality of dot spacers is formed between the optically transparent upper conductive layer and the optically transparent lower conductive layer. The upper substrate is a transparent and flexible film/plate. The lower substrate is a transparent and rigid plate made of glass. The optically transparent upper conductive layer and the optically transparent lower conductive layer are formed of conductive indium tin oxide (ITO). The upper and lower electrodes are formed by layers of silver paste.

In operation, an upper surface of the upper substrate is pressed with a finger, a pen or the like tool, and visual observation of a screen on the display device provided on a back side of the touch panel is allowed. This causes the upper substrate to be deformed, and the upper conductive layer thus comes in contact with the lower conductive layer at the position where pressing occurs. Voltages are applied successively from an electronic circuit to the optically transparent upper conductive layer and the optically transparent lower conductive layer. Thus, the deformed position can be detected by the electronic circuit.

However, the ITO layer generally has poor mechanical durability, low chemical endurance, and uneven resistance over an entire area of the touch panel. Moreover, the ITO layer has relatively low transparency in a humid environment. As such, the conventional touch panel is unsuitable for use in a car, especially when driving in the rain or snow. All the above-mentioned problems of the ITO layer tend to yield a touch panel with somewhat low sensitivity, accuracy, and brightness. Furthermore, the ITO layer is generally formed by means of ion-beam sputtering, and this method is relatively complicated.

What is needed, therefore, is to provide a touch control device having good durability, high sensitivity, accuracy, and brightness.

SUMMARY

In one embodiment, a touch control device includes a transparent substrate, a display element, and a touch panel. The display element is disposed on a surface of the transparent substrate and includes a displaying surface. The displaying surface is located away from the transparent substrate. The touch panel is located on opposite side of the display element from the transparent substrate. The touch panel includes a first electrode plate and a second electrode plate. The first electrode plate includes a first substrate and a first conductive layer disposed on a lower surface of the first substrate. The second electrode plate is separated from the first electrode plate and includes a second flexible substrate and a second conductive layer disposed on an upper surface of the second substrate. The first conductive layer and the second conductive layer both include a carbon nanotube layer.

Other novel features and advantages of the present touch control device will become more apparent from the following detailed description of exemplary embodiments when taken in conjunction with the accompanying drawings.

BRIEF DESCRIPTION OF THE DRAWINGS

Many aspects of the present touch control device can be better understood with reference to the following drawings. The components in the drawings are not necessarily to scale, the emphasis instead being placed upon clearly illustrating the principles of the present touch control device.

Figure 1:
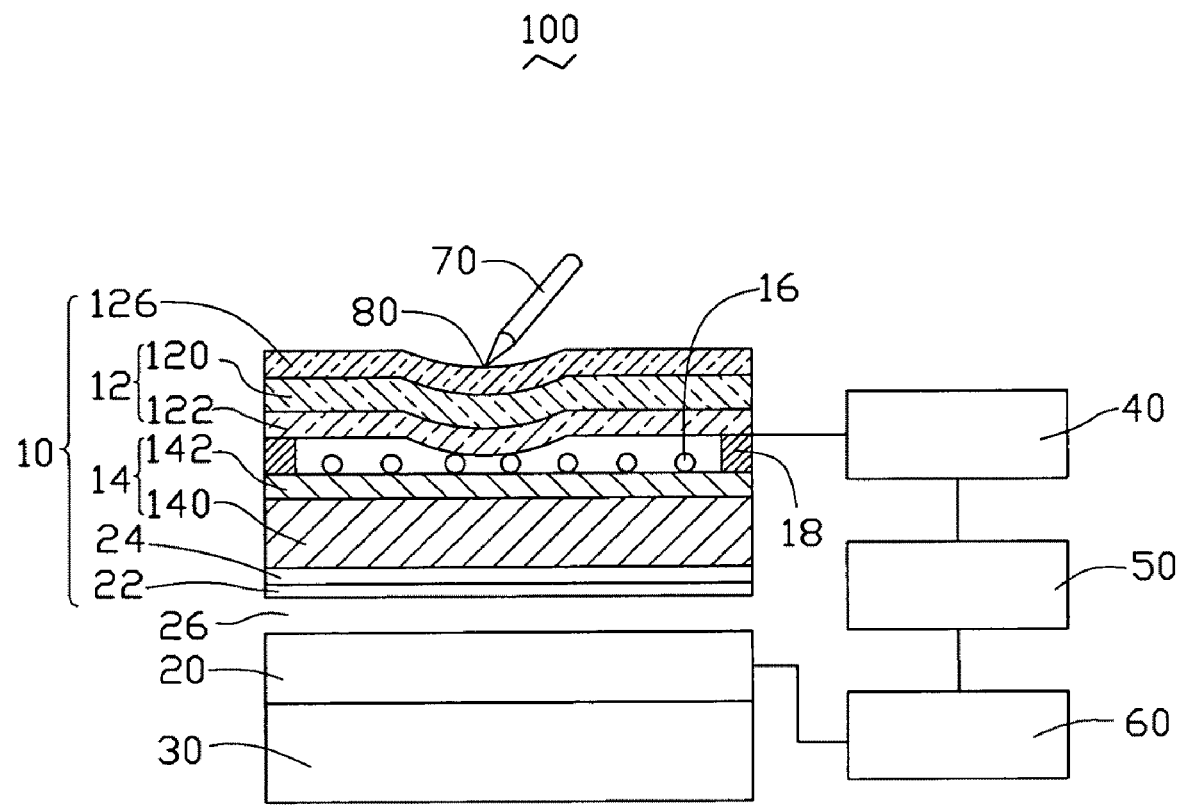
FIG. 1 is a side view of a touch control device in accordance with a present embodiment.

Corresponding reference characters indicate corresponding parts throughout the several views. The exemplifications set out herein illustrate at least one embodiment of the present touch control device, in at least one form, and such exemplifications are not to be construed as limiting the scope of the invention in any manner.

DETAILED DESCRIPTION OF EXEMPLARY EMBODIMENTS

References will now be made to the drawings to describe, in detail, embodiments of the present touch control device.

Referring to FIG. 1, a touch control device 100 includes a touch panel 10, a display element 20, and a windshield 30 like that found on an automobile. The display element 20 is disposed on an inner surface of the windshield 30. The display element 20 includes a first surface and a second surface. The first surface of the display element 20 is a displaying surface. The touch panel 10 can be directly disposed on the first surface of the display element 20, or can be opposite to and spaced from the first surface of the display element 20 by some spacers. The second surface of the display element 20 faces the inner surface of the windshield 30.

In one suitable embodiment, the display element 20 can be adhered to the inner surface of the windshield 30 by using a binder or fixed on the inner surface of the windshield 30 by screws. To avoid interfering with the user's field of view, the display element 20 can be set on a corner or a top of the windshield 30. It is to be understood that, the display element 20 and the touch panel 10 can be driven by an outer power supplied by a car's power. The display element 20 and the touch panel 10 can be connected by conducting lines that are disposed on a side of the windshield 30.

The windshield 30 can be a transparent substrate made of glass. The display element 20 can be an e-paper (i.e., a microencapsulated electrophoretic display), a flexible liquid crystal display, a flexible organic light emitting display (OLED), or any other flexible display. The display element 20 can also be a conventional display such as liquid crystal display, field emission display, plasma display, electroluminescent display, vacuum fluorescent display, cathode ray tube, or another display device. In the present embodiment, the display element 20 is a transparent electroluminescent display known in the art. The transparent electroluminescent display includes a transparent substrate serving a through view behind the display.

Figure 2:
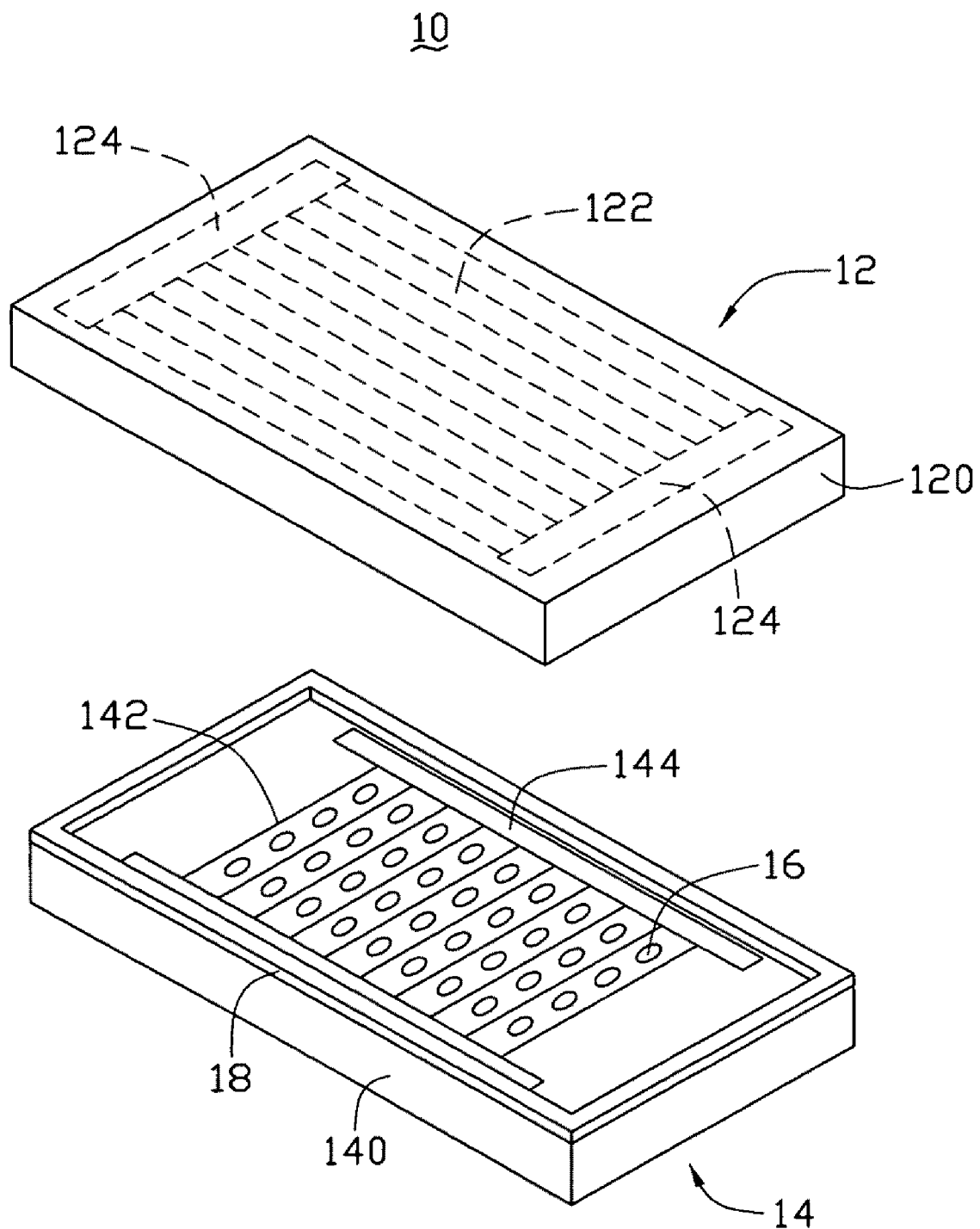
FIG. 2 is a schematic view of a partially assembled touch panel used in the touch control device of FIG. 1.

Referring to FIG. 2, a touch panel 10 includes a first electrode plate 12, a second electrode plate 14, and a plurality of dot spacers 16 disposed between the first electrode plate 12 and the second electrode plate 14.

The first electrode plate 12 includes a first substrate 120, a first conductive layer 122, and two first-electrodes 124. The first substrate 120 includes an upper surface and a lower surface, each of which is substantially flat. The two first-electrodes 124 and the first conductive layer 122 are located on the lower surface of the first substrate 120. The two first-electrodes 124 are located separately on opposite ends of the first conductive layer 122. A direction from one of the first-electrodes 124 across the first conductive layer 122 to the other first electrode 124 is defined as a first direction. The two first-electrodes 124 are electrically connected with the first conductive layer 122.

The second electrode plate 14 includes a second substrate 140, a second conductive layer 142, and two second-electrodes 144. The second substrate 140 includes an upper surface and a lower surface, each of which is substantially flat. The two second-electrodes 144 and the second conductive layer 142 are located on the upper surface of the second substrate 140. The two second-electrodes 144 are located separately on opposite ends of the second conductive layer 142. A direction from one of the second-electrodes 144 across the second conductive layer 142 to the other second-electrodes 144 is defined as a second direction. The two second-electrodes 144 are electrically connected with the second conductive layer 142.

The first direction is perpendicular to the second direction (i.e., the two first-electrodes 124 are orthogonal to the two second-electrodes 144). That is, the two first-electrodes 144 are aligned parallel to the second direction, and the two second-electrodes 146 aligned parallel to the first direction.

The first substrate 120 is a transparent and flexible film/plate. The second substrate 140 is transparent and can be flexible or rigid. The rigid material can be glass, diamond, or quartz. The transparent material can be polymer or resin selected from a group consisting of polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, and acrylic resins. A thickness of the first substrate 120 and the second substrate 140 can be in the approximate range from 1 millimeter to 1 centimeter. In the present embodiment, the first substrate 120 and the second substrate 140 are made of PET, and the thickness thereof are both about 2 millimeters.

The first-electrodes 124 and the second-electrodes 144 can be formed by metallic layers, conductive resin layers, carbon nanotube films or any other suitable materials. To be used in a car, the material of the first-electrodes 124 and the second-electrodes 144 can be transparent. In the present embodiment, the material of the first-electrodes 124 and the second-electrodes 144 are carbon nanotube films.

In the present embodiment, the two first-electrodes 124 are disposed on opposite ends of the first conductive layer 122 along the first direction and electrically connected to the first conductive layer 122. The two second-electrodes 144 are disposed on opposite ends of the second conductive layer 142 along the second direction and electrically connected to the second conductive layer 142. It is to be understood that the first-electrodes 124 and the second-electrodes 144 can be respectively disposed either on the first conductive layer 122 and the second conductive layer 142, or on the first substrate 120 and the second substrate 140.

An insulative layer 18 is provided between the first and the second electrode plates 12 and 14. The first electrode plate 12 is located on the insulative layer 18. The first conductive layer 122 is opposite to, but is spaced from, the second conductive layer 142. The dot spacers 16 are located on the second conductive layer 142. A distance between the second electrode plate 14 and the first electrode plate 12 is in an approximate range from 2 to 20 microns. The insulative layer 18 and the dot spacers 16 are made of, for example, insulative resin or any other suitable insulative material. Insulation between the first electrode plate 12 and the second electrode plate 14 is provided by the insulative layer 18 and the dot spacers 16. It is to be understood that the dot spacers 16 are optional, particularly when the touch panel 10 is relatively small. They serve as supports given the size of the span and the strength of the first electrode plate 12.

In the present embodiment, a transparent protective film 126 is disposed on the upper surface of the first electrode plate 12. The transparent protective film 126 can be a film that receives a surface hardening treatment to protect the first electrode plate 12 from being scratched when in use. The transparent protective film 126 can be adhered to the upper surface of the first electrode plate 12 or combined with the first electrode plate 12 by means of hot-pressing. The transparent protective film 126 can be plastic or resin. The material of the resin film can be selected from a group consisting of BCB, polyesters, acrylic resins, PET, and any combination thereof. In the present embodiment, the material of the transparent protective film 126 is PET.

At least one of the first conductive layer 122 and the second conductive layer 142 includes a transparent carbon nanotube layer. The carbon nanotube layer can include one or a plurality of transparent carbon nanotube films. It is to be understood that the size of the touch panel 10 is not confined by the size of the carbon nanotube films. When the size of the carbon nanotube films is smaller than the desired size of the touch panel 10, a plurality of carbon nanotube films can be coplanar, disposed side-by-side or overlapping to cover the entire surface of the first substrate 120 and the second substrate 140. Thus, the size of the touch panel 10 can be set as desired. A thickness of the carbon nanotube layer is set in a range where the carbon nanotube layer has an acceptable transparency. Alignment direction of the carbon nanotube films is set as desired.

The carbon nanotube film is formed by a plurality of carbon nanotubes, ordered or otherwise, and has a uniform thickness. The carbon nanotube film can be an ordered film or a disordered film. In the ordered film, the carbon nanotubes are primarily oriented along a same direction in each film. Different stratums/layers of films can have the nanotubes offset from the ones in other films. In the disordered film, the carbon nanotubes are disordered or isotropic. The disordered carbon nanotubes entangle with each other. The isotropic carbon nanotubes are substantially parallel to a surface of the carbon nanotube film.

Length and width of the carbon nanotube film can be arbitrarily set as desired. A thickness of the carbon nanotube film is in an approximate range from 0.5 nanometers to 100 micrometers. The carbon nanotubes in the carbon nanotube film include single-walled, double-walled, or multi-walled carbon nanotubes. Diameters of the single-walled carbon nanotubes, the double-walled carbon nanotubes, and the multi-walled carbon nanotubes can, respectively, be in the approximate range from 0.5 to 50 nanometers, 1 to 50 nanometers, and 1.5 to 50 nanometers.

Figure 3:
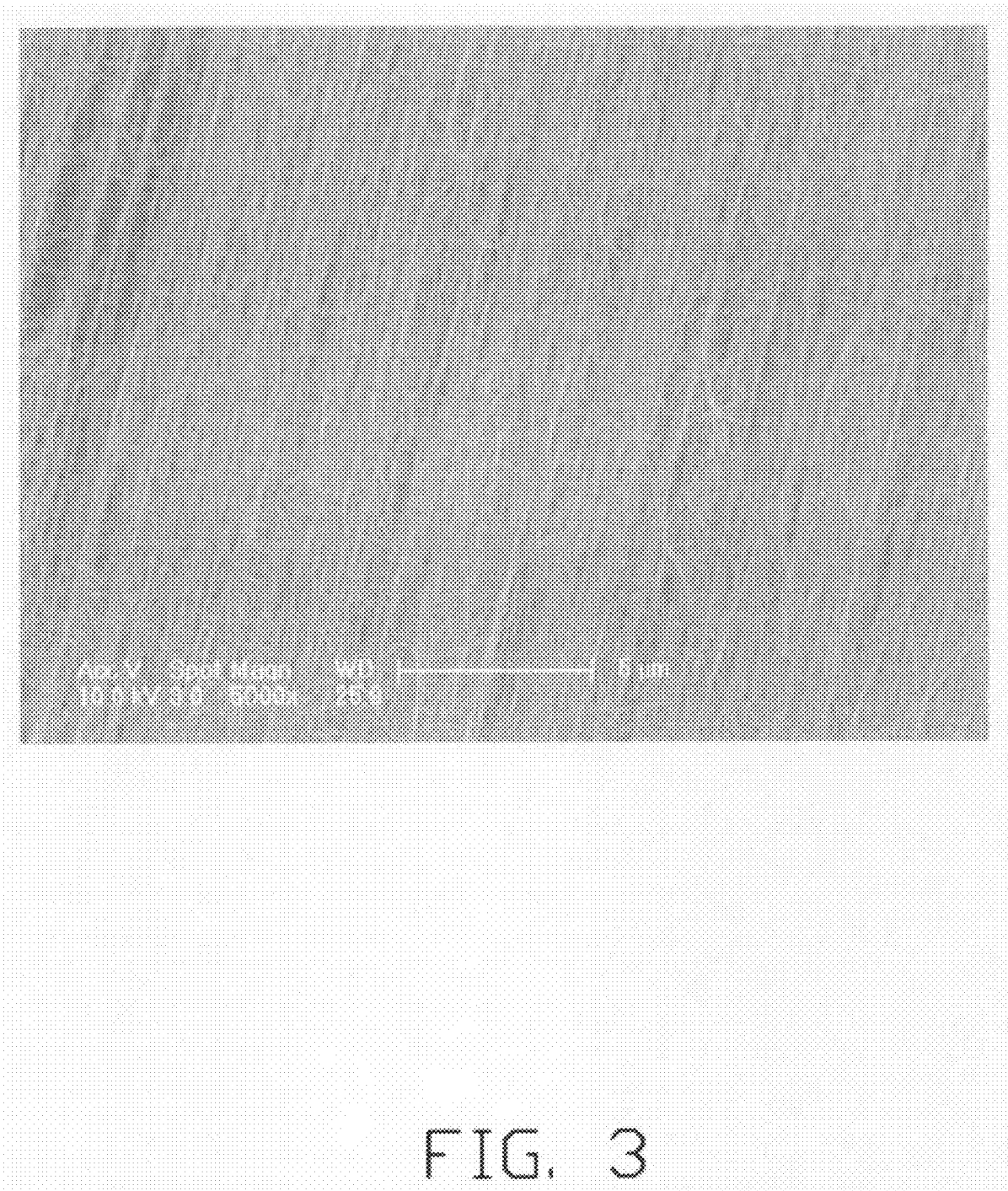
FIG. 3 shows a Scanning Electron Microscope (SEM) image of a carbon nanotube film used in the touch control device of FIG. 1.

In the present embodiment, the first conductive layer 122 and the second conductive layer 142 are carbon nanotube layers. The carbon nanotubes in the first conductive layer 122 are arranged along the first direction. The carbon nanotubes in the second conductive layer 142 are arranged along the second direction. The first direction is perpendicular to the second direction. As shown in FIG. 3, the majority of nanotubes are arraigned along a primary direction; however, the orientation of some of the nanotubes may vary. Each carbon nanotube layer may include a plurality of stacked carbon nanotube films aligned along a same direction. In each layer, the carbon nanotubes of the carbon nanotube films are aligned along a substantially same direction (i.e., the carbon nanotube film is the ordered film). More specifically, in each layer, each carbon nanotube film includes a plurality of successive and oriented carbon nanotubes joined end to end by van der Waals attractive force.

Figure 4:
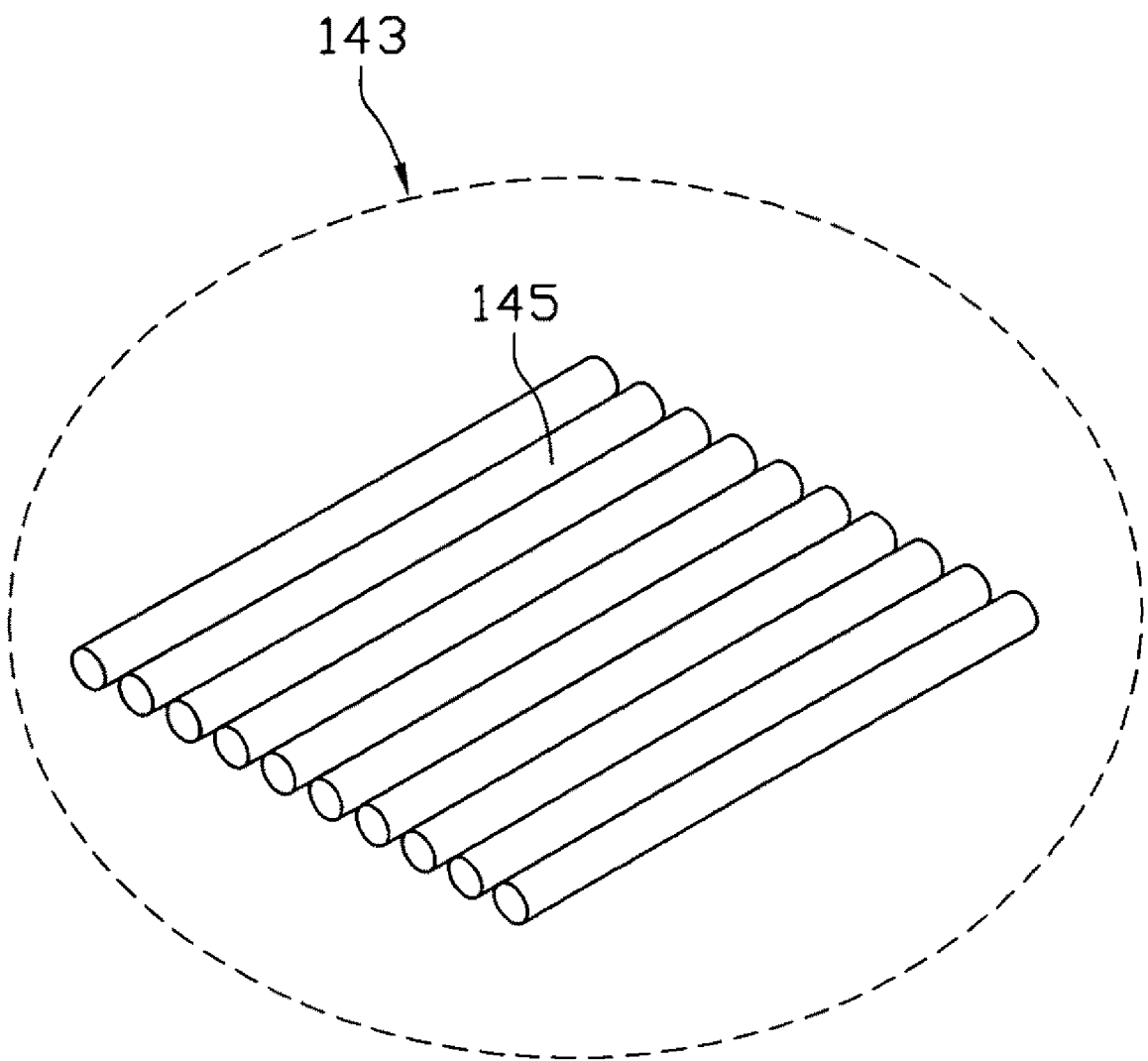
FIG. 4 is a structural schematic of a carbon nanotube segment.

Referring to FIGS. 3 and 4, each carbon nanotube film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation.

A method for fabricating the above-described carbon nanotube film of the present embodiment includes the steps of: (a) providing an array of carbon nanotubes, specifically providing a super-aligned array of carbon nanotubes; and (b) pulling out a carbon nanotube film from the array of carbon nanotubes, by using a tool (e.g., adhesive tape, pliers, tweezers, or another tool allowing multiple carbon nanotubes to be gripped and pulled simultaneously).

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can, beneficially, be a P-type silicon wafer, an N-type silicon wafer, or a silicon wafer with a film of silicon dioxide thereon. A 4-inch P-type silicon wafer is used as the substrate in the present embodiment.

In step (a2), the catalyst can, advantageously, be made of iron (Fe), cobalt (Co), nickel (Ni), or any alloy thereof.

In step (a4), the protective gas can, beneficially, be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters. The super-aligned array includes a plurality of carbon nanotubes parallel to each other and approximately perpendicular to the substrate. The carbon nanotubes in the array can be single-walled carbon nanotubes, double-walled carbon nanotubes, or multi-walled carbon nanotubes. Diameters of the single-walled carbon nanotubes are in the approximate range from 0.5 nanometers to 50 nanometers. Diameters of the double-walled carbon nanotubes are in the approximate range from 1 nanometer to 50 nanometers. Diameters of the multi-walled carbon nanotubes are in the approximate range from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by van der Waals attractive force.

In step (b), the carbon nanotube film can be formed by the substeps of: (b1) selecting one or more carbon nanotubes having a predetermined width from the super-aligned array of carbon nanotubes; and (b2) pulling the carbon nanotubes to form carbon nanotube segments at an even/uniform speed to achieve a uniform carbon nanotube film.

In step (b1), the carbon nanotube segments having a predetermined width can be selected by using an adhesive tape as the tool to contact the super-aligned array. Each carbon nanotube segment includes a plurality of carbon nanotubes parallel to each other. In step (b2), the pulling direction is substantially perpendicular to the growing direction of the super-aligned array of carbon nanotubes.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube film having a predetermined width can be formed. Referring to FIG. 3, the carbon nanotube film includes a plurality of carbon nanotubes joined end to end. The carbon nanotubes in the carbon nanotube film are all substantially parallel to the pulling/drawing direction of the carbon nanotube film, and the carbon nanotube film produced in such manner can be selectively formed to have a predetermined width. The carbon nanotube film formed by the pulling/drawing method has superior uniformity of thickness and conductivity over a typical disordered carbon nanotube film. Further, the pulling/drawing method is simple, fast, and suitable for industrial applications.

The width of the carbon nanotube film depends on a size of the carbon nanotube array. The length of the carbon nanotube film can be arbitrarily set, as desired. In one useful embodiment, when the substrate is a 4-inch P-type silicon wafer as in the present embodiment, the width of the carbon nanotube film is in an approximate range from 0.01 centimeter to 10 centimeters, and the thickness of the carbon nanotube film is in an approximate range from 0.5 nanometers to 100 microns. The carbon nanotubes in the carbon nanotube film includes single-walled carbon nanotubes, double-walled carbon nanotubes, or multi-walled carbon nanotubes. Diameters of the single-walled carbon nanotubes, the double-walled carbon nanotubes, and the multi-walled carbon nanotubes can, respectively, be in an approximate range from 0.5 to 50 nanometers, 1 to 50 nanometers, and 1.5 to 50 nanometers.

It is noted that because the carbon nanotubes in the super-aligned carbon nanotube array have a high purity and a high specific surface area, the carbon nanotube film is adherent in nature. As such, at least one carbon nanotube film can be directly adhered to a surface of the first substrate 120, the second substrate 140, and/or another carbon nanotube film, and electrically connect to the two first-electrodes 124 and the two second-electrodes 144 to form the first conductive layer 122 and the second conductive layer 142. In the alternative, other bonding means can be applied.

It is to be understood that, a plurality of carbon nanotube films can be adhered to a surface of the first substrate 120 and the second substrate 140 and can be stacked on each other to form the two carbon nanotube layers. The number of the films and the angle between the aligned directions of two adjacent films can be set as desired. When the carbon nanotube films are adhered along a same direction, the carbon nanotubes in the whole carbon nanotube layer are arranged along the same direction. When the carbon nanotube films are adhered along different directions, an angle a between the alignment directions of the carbon nanotubes in each pair of adjacent carbon nanotube films is in the range $0<\alpha\leqq90°$. The angle $\alpha$ is the difference in the two pulling directions of the adjacent carbon nanotube films. The adjacent carbon nanotube films are combined by van de Waals attractive force to form a stable carbon nanotube layer. In the present embodiment, a plurality of carbon nanotube films are adhered on the first substrate 120 along the first direction and electrically connected to the two first-electrodes 124 to form the first conductive layer 122, and adhered on the second substrate 140 along the second direction and electrically connected to the two second-electrodes 144 to form the second conductive layer 142.

An additional step of treating the carbon nanotube films in the touch panel 10 with an organic solvent can be further provided. Specifically, the carbon nanotube film can be treated by applying organic solvent to the carbon nanotube film to soak the entire surface of the carbon nanotube film. The organic solvent is volatilizable and can, suitably, be selected from the group consisting of ethanol, methanol, acetone, dichloroethane, chloroform, any appropriate mixture thereof. In the present embodiment, the organic solvent is ethanol. After being soaked by the organic solvent, microscopically, carbon nanotube strings will be formed by adjacent carbon nanotubes in the carbon nanotube film, that are able to do so, bundling together, due to the surface tension of the organic solvent. In one aspect, part of the carbon nanotubes in the untreated carbon nanotube film that are not adhered on the substrate will come into contact with the substrate 120,140 after the organic solvent treatment due to the surface tension of the organic solvent. Then the contacting area of the carbon nanotube film with the substrate will increase, and thus, the carbon nanotube film can firmly adhere to the surface of the substrate 120,140. In another aspect, due to the decrease of the specific surface area via bundling, the mechanical strength and toughness of the carbon nanotube film are increased and the coefficient of friction of the carbon nanotube films is reduced. Macroscopically, the film will be an approximately uniform carbon nanotube film.

The touch panel 10 can further include a shielding layer 22 disposed on the lower surface of the second substrate 140. The material of the shielding layer 22 can be ITO films, conductive resin films, carbon nanotube films, or other transparent conductive films. In the present embodiment, the shielding layer 22 is a carbon nanotube film. The carbon nanotube film includes a plurality of carbon nanotubes, and the alignment of the carbon nanotubes therein can be arbitrary. In the present embodiment, the carbon nanotubes in the carbon nanotube film of the shielding layer 22 are arranged along a same direction. The carbon nanotube film is connected to ground and acts as shielding, thus enabling the touch panel 10 to operate without interference (e.g., electromagnetic interference).

When the touch panel 10 includes the shielding layer 22, a passivation layer 24 can be disposed on a surface of the shielding layer 22, facing away from the second substrate 140. The material of the passivation layer 24 can be selected from a group consisting of silicon nitride, silicon dioxide, benzocyclobutenes, polyesters, acrylic resins, polyethylene terephthalate, and any combination thereof. The passivation layer 24 can be spaced at a certain distance from the display element 20 or can be directly installed on the display element 20. When the passivation layer 24 is spaced at a distance from the display element 30, understandably, two or more spacers can be used. Thereby, a gap 26 is provided between the passivation layer 24 and the display element 20. The passivation layer 24 protect the shielding layer 22 from chemical damage (e.g., humidity of the surrounding) or mechanical damage (e.g., scratching during fabrication of the touch panel).

The touch panel 10 can be adhered to the display element 20 by using a binder or fixed on the display element 20 by some screws. When the display element 20 is a transparent electroluminescent display, and the first substrate 120 and the second substrate 140 of the touch panel 10 are both flexible, the touch panel 10 can be combined with the display element 20 by means of hot-pressing. It is to be understood that the second substrate 120 is optional. In another embodiment, the second conductive layer 142 can be directly adhered to the first surface of the display element 20.

The touch control device 100 can further include a first controller 40, a central processing unit (CPU) 50, and a second controller 60. Quite suitably, the touch panel 10 is opposite and adjacent to the display element 20 and is connected to the first controller 40 by an external circuit. The first controller 40, the CPU 50, and the second controller 60 are electrically connected. The display element 20 is electrically connected to the second controller. As such, the CPU 50 is connected to the second controller 60 to control the display element 20.

In operation, a voltage of 5V is respectively applied to the two first-electrodes 124 of the first electrode plate 12 and the two second-electrodes 144 of the second electrode plate 14. A user operates the display by pressing the first electrode plate 12 of the touch panel 10 with a finger, a pen 70, or the like while visually observing the display element 20 through the touch panel 10. This pressing causes a deformation 80 of the first electrode plate 12. The deformation 80 of the first electrode plate 12 causes a connection between the first conductive layer 122 and the second conduction layer 142 of the second electrode plate 14. Changes in voltages in the first direction of the first conductive layer 142 and the second direction of the second conductive layer 142 can be detected by the first controller 30. Then, the first controller 40 transforms the changes in voltages into coordinates of the pressing point and sends the coordinates thereof to the CPU 50. The CPU 60 then sends out commands according to the coordinates of the pressing point and controls the display of the display element 20 by the second controller 30.

It will be apparent to those having ordinary skill in the field of the present invention that the touch control device 100 can not only be used in a car but also any other vehicle including a windshield 30 to control the electronic devices therein.

The properties of the carbon nanotubes provide superior toughness, high mechanical strength, and uniform conductivity to the carbon nanotube film and the carbon nanotube layer. Thus, the touch control device using the same adopting the carbon nanotube layer are durable and highly conductive. The carbon nanotube films have a good transparency in humid environments. As such, the touch control device using the same is suitable for using in a vehicle. Further, the pulling method for fabricating each carbon nanotube film is simple, and the adhesive carbon nanotube film can be disposed on the substrate directly without the use of a separate bonding means. As such, the method for fabricating the carbon nanotube film is suitable for the mass production of the touch control devices using the same and reduces the costs thereof. Additionally, since the carbon nanotubes have excellent electrical conductivity properties, the carbon nanotube layer formed by a plurality of carbon nanotubes has a uniform resistance distribution. Thus the touch control device adopting the carbon nanotube layer has improved sensitivity and accuracy.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that above description and the claims claims drawn to a method may include some indication in reference to certain steps. However, the indication used is only to be viewed for identification purposes and not as a suggestion as to an order for the steps.

The invention claimed is:

1. A touch control device comprising:
a transparent substrate comprising a surface;
a display element disposed on the surface of the transparent substrate and comprising a displaying surface located away from the transparent substrate; and
a touch panel located at opposite side of the display element from the transparent substrate, wherein the touch panel comprises a first electrode plate and a second electrode plate spaced from the first electrode plate; the first electrode plate comprises:
a first substrate,
a first conductive layer disposed on a lower surface of the first substrate; and
two first-electrodes separately located on opposite ends of the first conductive layer, a direction from one of the two first-electrodes across the first conductive layer to another one of the two first-electrodes being defined as a first direction;
the second electrode plate comprises:
a second substrate;
a second conductive layer disposed on an upper surface of the second substrate; and
two second-electrodes separately located on opposite ends of the second conductive layer, a direction from one of the two second-electrodes across the second conductive layer to another one of the two second-electrodes being defined as a second direction, wherein the first conductive layer comprises a stand-alone, self-adhesive first carbon nanotube film; the first carbon nanotube film comprises a plurality of first carbon nanotube segments joined end-to-end by van der Waals attractive force therebetween; each of the plurality of first carbon nanotube segments comprises a plurality of first carbon nanotubes parallel to each other and joined by van der Waals attractive force therebetween; the plurality of first carbon nanotube segments are successively oriented and integrated together by van der Waals attractive force therebetween to form the first carbon nanotube film, wherein the second conductive layer comprises a stand-alone, self-adhesive second carbon nanotube film; the second carbon nanotube film comprises a plurality of second carbon nanotube segments joined end-to-end by van der Waals attractive force therebetween; each of the plurality of second carbon nanotube segments comprises a plurality of second carbon nanotubes parallel to each other and joined by van der Waals attractive force therebetween; the plurality of second carbon nanotube segments are successively oriented and integrated together by van der Waals attractive force therebetween to form the second carbon nanotube film, and wherein the plurality of first carbon nanotubes in the first conductive layer are arranged along the first direction, and the plurality of second carbon nanotubes in the second conductive layer are arranged along the second direction.

2. The touch control device as claimed in claim 1, wherein the first carbon nanotubes are substantially parallel to the lower surface of the first substrate and the second carbon nanotubes are substantially parallel to the upper surface of the second substrate.

3. The touch control device as claimed in claim 1, wherein a thickness of the first carbon nanotube film or the second carbon nanotube film is in an approximate range from 0.5 nanometers to 100 microns, and a width of the first carbon nanotube film or the second carbon nanotube film is in an approximate range from 0.01 centimeter to 10 centimeters.

4. The touch control device as claimed in claim 1, wherein the first and second carbon nanotubes are selected from the group consisting of single-walled carbon nanotubes, double-walled carbon nanotubes, multi-walled carbon nanotubes, and any combination thereof, diameters of the single-walled carbon nanotubes, the double-walled carbon nanotubes, and the multi-walled carbon nanotubes are respectively in the approximate range from 0.5 to 50 nanometers, 1 to 50 nanometers, and 1.5 to 50 nanometers.

5. The touch control device as claimed in claim 1, wherein the first substrate is made of a flexible material, and the second substrate is made of a rigid material or a flexible material, the flexible material is selected from the group consisting of polycarbonate, polymethyl methacrylate acrylic, polyethylene terephthalate, polyether polysulfones, polyvinyl polychloride, benzocyclobutenes, polyesters, acrylic resins, and any combination thereof, the rigid material is selected from the group consisting of glasses, diamonds and quartzes.

6. The touch control device as claimed in claim 1, wherein the first direction is perpendicular to the second direction.

7. The touch control device as claimed in claim 1, further comprising an insulative layer and a plurality of dot spacers, the insulative layer is disposed between the first electrode plate and the second electrode plate to space the first electrode plate from the second electrode plate, the plurality of dot spacers are separately disposed on the second conductive layer and located between the first electrode plate and the second electrode plate.

8. The touch control device as claimed in claim 1, wherein transparent substrate comprises a wind shield, and the display element is located off-center on the windshield.

9. The touch control device as claimed in claim 1, wherein the display element is selected from the group consisting of liquid crystal displays, field emission displays, plasma displays, electroluminescent displays, vacuum fluorescent displays, cathode ray tubes, e-papers, flexible liquid crystal displays, flexible organic light emitting displays, and transparent electroluminescent displays.

10. The touch control device as claimed in claim 1, further comprising a first controller configured for controlling the touch panel, a central processing unit, and a second controller configured for controlling the display element, the first controller, the central processing unit and the second controller being electrically connected with each other, the display element being connected to the second controller, and the touch panel being connected to the first controller.

11. The touch control device as claimed in claim 1, wherein the touch panel is adhered on the display element by a binder or by means of hot-pressing, the display element is adhered on the transparent substrate by using a binder or fixed on the transparent substrate by fasteners.

12. The touch control device as claimed in claim 1, further comprising a shielding layer, a passivation layer and a transparent protective film, the shielding layer is disposed on a lower surface of the second substrate, and the material of the shielding layer being selected from the group consisting of conductive resin films, carbon nanotube films, and any combination thereof, the passivation layer is disposed on the shielding layer, and the material of the passivation layer is selected from the group consisting of silicon nitride, silicon dioxide, benzocyclobutenes, polyesters, acrylic resins, polyethylene terephthalate, and any combination thereof, the transparent protective film is disposed on an upper surface of the first electrode plate, and the material of the transparent protective film being selected from the group consisting of benzocyclobutenes, polyesters, acrylic resins, polyethylene terephthalate, and any combination thereof.

13. A touch control device comprising:
a transparent substrate comprising a surface;
a display element disposed on the surface of the transparent substrate and comprising a displaying surface located away from the transparent substrate; and
a touch panel located at an opposite side of the display element away from the transparent substrate, wherein the touch panel comprises a first electrode plate and a second electrode plate spaced from the first electrode plate; the first electrode plate comprises:
a first substrate,
a first conductive layer disposed on a lower surface of the first substrate; and
two first-electrodes separately located on opposite ends of the first conductive layer, a direction from one of the two first-electrodes across the first conductive layer to another one of the two first-electrodes being defined as a first direction;
the second electrode plate comprises:
a second substrate;
a second conductive layer disposed on an upper surface of the second substrate; and
two second-electrodes separately located on opposite ends of the second conductive layer, a direction from one of the two second-electrodes across the second conductive layer to another one of the two second-electrodes being defined as a second direction, wherein
the first conductive layer comprises a stand-alone, self-adhesive first carbon nanotube film; the first carbon nanotube film comprises a plurality of first carbon nanotube segments joined end-to-end by van der Waals attractive force therebetween; each of the plurality of first carbon nanotube segments comprises a plurality of first carbon nanotubes parallel to each other and joined by van der Waals attractive force therebetween; the plurality of first carbon nanotube segments are successively oriented and integrated together by van der Waals attractive force therebetween to form the first carbon nanotube film, the plurality of first carbon nanotubes in the first conductive layer are arranged along the first direction.

* * * * *